United States Patent [19]

Baier et al.

[11] 4,214,209

[45] Jul. 22, 1980

[54] CIRCUIT FOR SYNCHRONIZING A PSEUDO-RANDOM GENERATOR MOUNTED AT A RECEIVER FOR COMMUNICATION TRANSMISSION SYSTEMS UTILIZING PSEUDO-NOISE PHASE SHIFT KEYING

[75] Inventors: Walter P. Baier, Kaiserslautern; Harald Grammueller, Unterpfaffenhofen, both of Fed. Rep. of Germany

[73] Assignee: Siemens Aktiengesellschaft, Berlin & Munich, Fed. Rep. of Germany

[21] Appl. No.: 942,125

[22] Filed: Sep. 13, 1978

[30] Foreign Application Priority Data

Sep. 22, 1977 [DE] Fed. Rep. of Germany ....... 2742696

[51] Int. Cl.$^2$ .......................... H04K 1/04; H04L 7/00; H04L 27/10
[52] U.S. Cl. .......................................... 375/1; 375/57; 375/115
[58] Field of Search ............................ 325/30, 58, 320; 178/67, 69.1, 66 R; 179/15 BS

[56] References Cited

U.S. PATENT DOCUMENTS

| | | | |
|---|---|---|---|
| 3,402,265 | 9/1968 | Couvillon, Jr. | 178/69.1 |
| 3,953,674 | 4/1976 | Fletcher et al. | 178/69.1 |
| 4,023,103 | 5/1977 | Malm | 325/58 |
| 4,039,749 | 8/1977 | Gordy et al. | 325/320 |
| 4,048,563 | 9/1977 | Osborne | 179/15 BS |
| 4,095,047 | 6/1978 | von Pieverling | 178/69.1 |

OTHER PUBLICATIONS

"Spread Spectrum Systems", Dixon, John Wiley & Sons, New York, 1976, pp. 12-19 & 180-213.

Siemens Forschungs- und Entwicklungs-Berichte, 4 (1975), Nr. 2, pp. 61-67.
IEEE Transactions on Communication Technology, vol. COM 12, 1964, pp. 123-127.
IEEE Transactions on Communication Technology, vol. COM-13, 1965, pp. 475-483.
Proceedings of the IEEE, vol. 64, No. 5, 1976, pp. 751-753.

Primary Examiner—Benedict V. Safourek
Attorney, Agent, or Firm—Hill, Van Santen, Steadman, Chiara & Simpson

[57] ABSTRACT

A circuit for synchronizing a pseudo-random generator at a receiver and which actuates a phasing device that cancels phase shift keying accomplished at the transmitter and uses a regulating loop with a delay device such as a delay line for correlating the received signal with the pseudo-random sequence which is produced at the receiver and conforms with a transmitter pseudo-random sequence and consists of a random alignment of the binary values L and H in a fixed pulse plan where the sequence repeats following a specific number of timing pulses and wherein the delay device which is fed with the received signal has a plurality of tappings which are of the same time spacing and which correspond to the reciprocal of the pulse train frequency of the pseudo-random sequence with a first portion of the tappings connected directly to an adding device at the receiver and the second portion of the tappings connected to the adding device through an 180° phase reversal means and the output of the adding device is fed to a rectifier and wherein a phase detector receives the output of the rectifier and the output from a pseudo-random generator at the receiver and the phase detector controls a voltage controlled oscillator through a loop filter which regulates the pulse train frequency of the pseudo-random generator.

8 Claims, 5 Drawing Figures

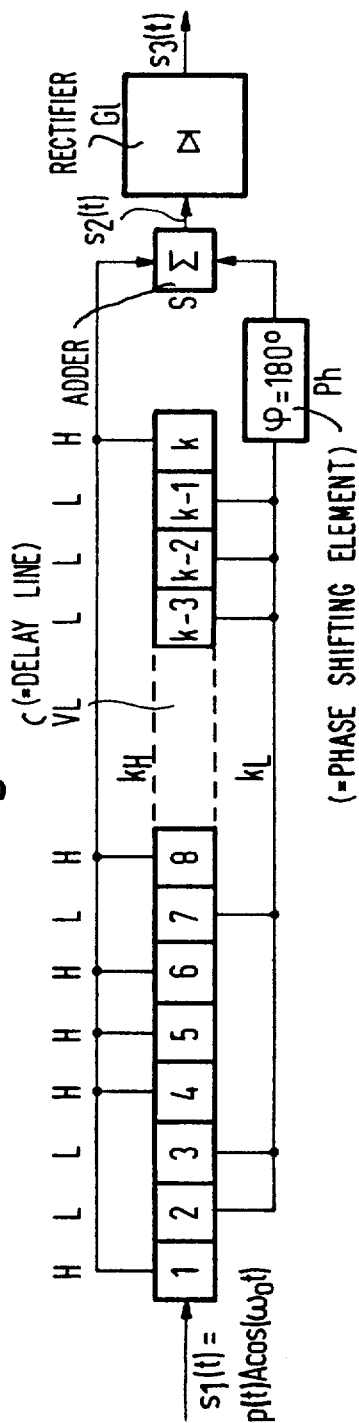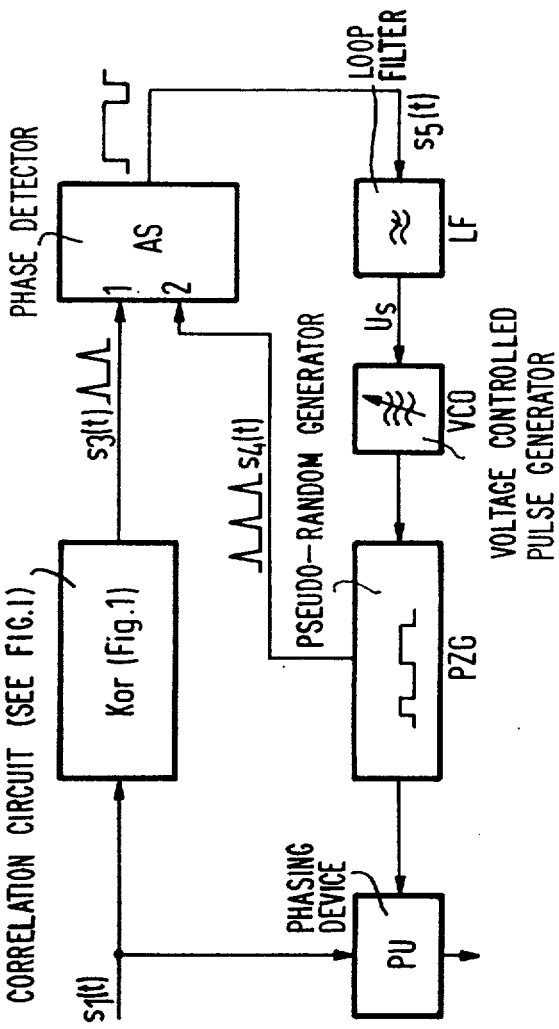

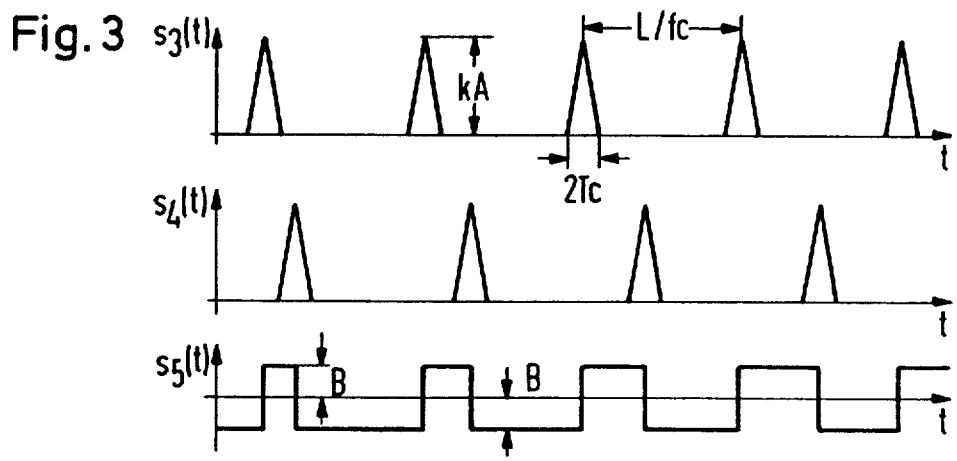
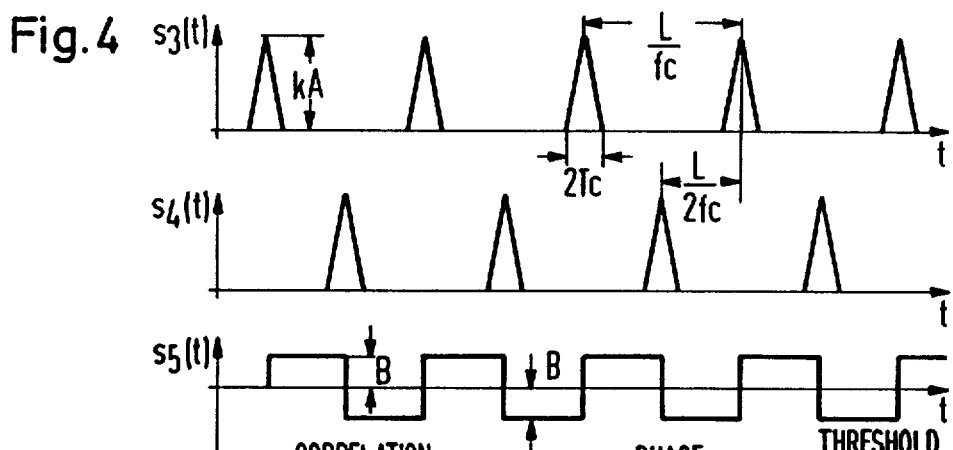
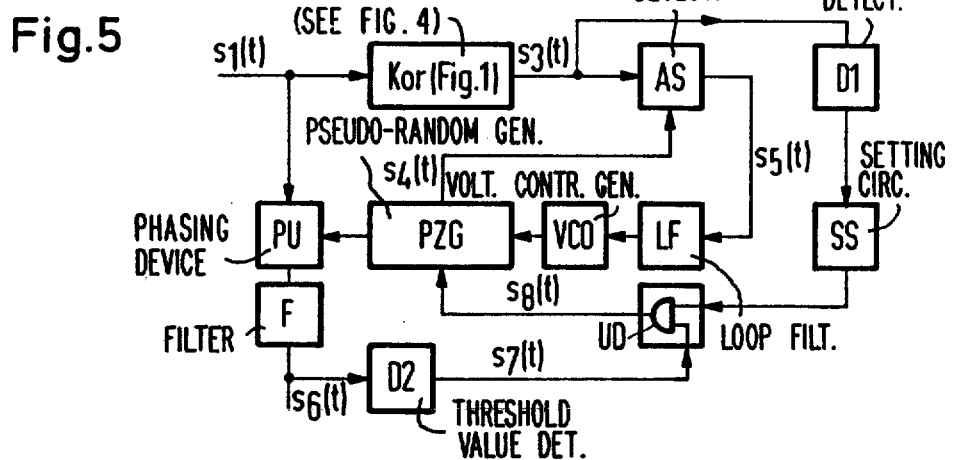

CIRCUIT FOR SYNCHRONIZING A PSEUDO-RANDOM GENERATOR MOUNTED AT A RECEIVER FOR COMMUNICATION TRANSMISSION SYSTEMS UTILIZING PSEUDO-NOISE PHASE SHIFT KEYING

BACKGROUND OF THE INVENTION

1. Field of the Invention

The invention relates to a circuit for synchronizing a pseudo-random generator at a receiver for communication transmission systems utilizing pseudo-noise phase shift keying.

2. Description of the Prior Art

Interference suppressing communication transmission systems utilizing narrow band conventional modulation and additional pseudo-noise phase shift keying modulation (PN-PSK) are known.

SUMMARY OF THE INVENTION

The present invention relates to an improved circuit for interference suppression communication transmission systems utilizing narrow band conventional modulation and additional pseudo-noise phase shift keying and which serves to synchronize a pseudo-random generator which is arranged at the receiver and which actuates a phasing device at the receiver to cancel a phase shift keying modulation occurring at the transmitter which uses a regulating loop comprising a delay device such as delay line for correlating the received signal with the pseudo-random sequence which is produced at the receiver and which correlates with the transmitter pseudo-random sequence and consists of generally random arrangement of the binary values L and H in a fixed pulse arrangement wherein the sequence repeats itself after a specific number of timing pulses.

The synchronization of the pseudo-random generator at the receiver to the pseudo-random sequence contained in the received signal is essential for the functioning of the communication transmission system. It is necessary to differentiate between the initial synchronization acquisition at the beginning of the transmission or after a loss of synchronization occurring subsequent to acquisition and the maintaining of synchronization following the initial acquisition. Articles which are relevant to these problems are discussed, for example, in the publication by W. P. Baier "Überlegungen zu störsicheren drahtlosen Nachrichtenubertragungssystemen", printed by Siemens Forsch. und Entw. Berichte 4 1975 at pages 61–67 and see also the book by R. C. Dixon entitled "Spread Spectrum Systems", published in New York in 1976.

It is known to carry out the initial synchronization and the maintenance of the synchronization by separate functional units each of which, however, requires a considerable expenditure of money. Previously employed acquisition processes are described for example in the articles by G. F. Sage entitled "Serial Synchronization by Pseudo-noise Systems", IEEE Transaction Comm. Tech., Vol. COM-12, 1964, at pages 723–727. See also the publication by R. B. Ward entitled "Acquisition of Pseudo-noise Signals by Sequential Estimation", IEEE Transactions Comm. Tech. Vol. COM-13, 1965, pages 475–483 and the article by D. P. Morgan, J. M. Hannah, J. H. Collins entitled "Spread-Spectrum Synchronizer Using a SAW Convolver and Recirculation Loop", IEEE Proc. Vol. 64, 1976, pages 751–753.

It is known to use a so-called delay-lock loop circuit so as to maintain synchronization. A circuit of this type is disclosed in the article by W. J. Gill entitled "A Comparison of Binary Delay-Lock Tracking-Loop Implementations", IEEE Transactions Aerospace and Electronic Systems, Vol. AES-2, 1966, pages 415–424.

The object of the present invention is to solve the problem of acquisition as well as to solve the problem of maintaining the synchronization between the receiver pseudo-random generator and the pseudo-random sequence contained in the received signal in interference suppressing communications transmission systems utilizing narrow band message modulation and additional pseudo-noise phase shift keying modulation for band spreading by one single function unit of very simple construction. According to the invention, the same is accomplished in that the delay device which is supplied with the received signal possesses k tappings and the time spacing between each of the tappings corresponds to the inverse value of the pulse train frequency of the pseudo-random sequence. Furthermore, a first part of the tappings is connected directly and a second part of the tappings are connected through a 180° phase shift device to the inputs of an adding means and the program selection of the tappings for the two parts are such that one part corresponds to the L values and the other part to the H values of the binary pseudo-random sequence or a portion thereof and that the output signal of the adding element is fed to a rectifier and the output of the rectifier is fed as one input to a phase detector and a signal which is periodically derived from the pseudo-random generator at the receiver is also fed to the phase detector and the output voltage of the phase detector is utilized to regulate the pulse train frequency of the pseudo-random generator at the receiver by controlling a voltage controlled oscillator which controls the frequency of the pseudo-random generator.

An advantage and further development of the invention consists in that the pulse signal which is fed to the second input of the phase detector is derived from the pseudo-random generator in a manner such that the pulse peaks of this signal train occur whenever the shift register stages of the pseudo-random generator exhibit that particular configuration of the pseudo-random sequence produced at the receiver which differs from the configuration programmed into the tapped delay device by one-half the length of the pseudo-random sequence. The phase detector is designed such that following the occurrence of a signal peak at one input it produces a DC voltage signal of a specific value at its output and that following the occurrence of a signal peak at the second output a DC voltage of the same value but of opposite polarity is present at the output. Thus, a rectangular pulse train is obtained of which the means value is zero when there is no phase difference between the pseudo-random sequence of the transmitter and that of the receiver. In all other cases, a DC component is produced which serves as a regulating voltage so as to regulate the pulse train frequency of the pseudo-random generator at the receiver. It is desirable that the input of the phase detector which is supplied with the rectified output signal of the adding device, in other words, the correlated signal is preceded by a threshold circuit. This is desirable and necessary whenever an interference signal is superimposed upon the received signal.

The pulse train frequency of the pseudo-random generator at the receiver is expediently determined by control of a voltage controlled oscillator with the output voltage produced by the phase detector being supplied to the control input of the voltage controlled oscillator after having passed through a regulating loop filter and serving as a frequency regulating voltage.

Another object of the present invention provides that the acquisition time of the synchronization process can be considerably shortened by additionally supplying the rectified output signal of the adding device which is the correlated signal to a threshold value detector which has a threshold set based on the signal to noise ratio to be such that the auto-correlation pulses are detected with a specific degree of probability and with a specific error rate and wherein the threshold value detector is followed by a setting circuit and it in turn by an AND-gate circuit which produces an output signal considering the occurring signal delays to set the pseudo-random generator of the receiver. The AND-gate is fed a second input signal which is derived from the output of the phase inverter device and has been supplied through a filter and through a second threshold value detector circuit which has its threshold value set to depend upon a specific non-detection probability and a specific error rate. Ideally, the second threshold value detector has an error rate of zero and a non-detection probability of zero.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 illustrates in block form a correlation circuit used in the synchronizing circuit of the invention and discloses the tap delay line;

FIG. 2 is a block diagram of the receiver synchronizing unit;

FIG. 3 illustrates three wave forms plotted against time comprising the signals which are provided as the two inputs of the phase detector and the third wave form is the output of the phase detector and illustrates the condition when a phase difference exists between the received pseudo-random sequence and the pseudo-random sequence produced at the receiver;

FIG. 4 illustrates three wave forms plotted against time comprising the two inputs to the phase detector and the output of the phase detector under the condition in which no phase difference exists between the received pseudo-random signal and that produced at the receiver; and FIG. 5 comprises a block diagram of a modification of the invention for reducing the acquisition synchronization time.

DESCRIPTION OF THE PREFERRED EMBODIMENTS

FIG. 1 schematically illustrates a tapped delay line VL including the additionally required circuitry. An input signal $s_1(t)$ to the delay line has a carrier frequency $\omega_o/(2\pi)$ and an amplitude of A. The phase changes between 0° and 180° at the binary timing periodically established pseudo-random sequence p(t) $\epsilon$ 1, $-1$. Thus $$s_1(t) = p(t) \cdot A \cdot \cos(\omega_o t) \quad (1)$$

The pseudo-random sequence p(t) has the pulse train frequency of $f_c = 1/T_c$. The delay line has k tappings spaced by a time interval of $T_c$. According to a portion or to the period of the sequence p(t), the portion $k_H$ of the k output signals of the delay line VL is fed directly to an adding device S and the remaining portion $k_L = k - k_H$ is fed to a phase shifter Ph which accomplishes 180° phase shift of the input signals and which supplies its output to the adder S. The output of the adding or summing device S comprises a signal $s_2(t)$ which is supplied to a rectifier G1. The output of the adding device S comprises the signal $s_2(t)$ which has a carrier frequency of $\omega_o/(2\pi)$. Generally, the amplitude of the signal $s_2(t)$ is relatively low. Only when the phase shifts in that portion of the signal $s_1(t)$ present in the delay line VL match that portion which has been programmed into the delay line VL in the illustrated case HLLHHHLH. . . LLLH of the pseudo-random sequence does the signal $s_2(t)$ possess a larger amplitude. The maximum amplitude would be kA.

After rectification in the rectifier G1 of the signal $s_2(t)$ the signal $s_3(t)$ illustrated in the upper lines in FIGS. 3 and 4 is obtained. The signal $s_3(t)$ is repetitive and has a period of $LT_c$ where L is the number of bits of the pseudo-random sequence p(t). The individual peak pulses of the signals $s_3(t)$ at their base have a duration of approximately $2T_c$.

FIG. 2 comprises a block circuit diagram of a receiver synchronizing circuit according to the invention for PN-PSK signals. The received signal $s_1(t)$ is fed to the input of a correlation circuit Kor which is identical to the circuit illustrated in FIG. 1 and includes the tap delay line VL and the other components illustrated in FIG. 1. The output of the correlation circuit Kor is the periodic signal $s_3(t)$ illustrated in the upper lines of FIGS. 3 and 4. A pseudo-random generator PZG which has its frequency controlled by a voltage controlled pulse generator VCO and produces in the receiver the same pseudo-random sequence as the transmitter pseudo-random generator. However, the two pseudo-random sequences generally possess a specific phase difference $\epsilon$ at the receiver. $\epsilon$ comprises the lead in phase of the pseudo-random sequence p(t) contained in the received signal $s_1(t)$ relative to the pseudo-random sequence produced in the receiver modulo $L/f_c$.

At the output of the receiver pseudo-random generator PZG, there is obtained a signal $s_4(t)$ which has fundamentally the same shape as the signal $s_3(t)$. However, the peaks of the signal $s_4(t)$ occur whenever the shift register stages of the pseudo-random generator PZG contain that portion of the pseudo-random sequence produced in the receiver which differs from the portion programmed into the tapped delay line VL illustrated in FIG. 1 by L/2 (L is the number of bits of the pseudo-random sequence p(t)). When synchronism does not exist ($\epsilon \neq 0$), the curves for the signals $s_3(t)$ and $s_4(t)$ will have different periods as illustrated by the curves shown in FIG. 3. When synchronism occurs ($\epsilon = 0$) the signals $s_3(t)$ and $s_4(t)$ will have the same period and the phase relationship illustrated in FIG. 4. Under a synchronization condition the peaks of the signals $s_3(t)$ and $s_4(t)$ occur alternately and equidistantly apart. The interval of time between adjacent peaks of the signals $s_3(t)$ and $s_4(t)$ is equal to $L/(2f_c)$.

As illustrated in FIG. 2, the signals $s_3(t)$ and $s_4(t)$ are respectively fed to the 1 and 2 inputs of a phase detector AS. Upon the occurrence of a peak of signal $s_2(t)$, the output signal of the phase detector AS designated $s_5(t)$ jumps to the value $s_5(t)=B(>0)$. On the occurrence of the signal $s_4(t)$, the output signal jumps to the value $s_5(t)=-B$. The curves of the lower lines of FIGS. 3 and 4 represent the signals $s_5(t)$ at the output of the phase detector AS where the cases of non-synchronism ($\epsilon \neq 0$) FIG. 3 and synchronism ($\epsilon=0$) FIG. 4. When $\epsilon=0$ the signal $s_5(t)$ will have the mean value of 0 as shown in FIG. 4. When an interference signal is superimposed upon the received signal $s_1(t)$, a threshold circuit must be provided in the phase detector AS for the signal $s_3(t)$.

The DC voltage contained in the signal $s_5(t)$ is used to adjust the frequency of the pulse generator VCO in a manner such that first the state $\epsilon=0$ is accomplished and is also maintained. For this purpose, the signal $s_5(t)$ is fed by way of a loop filter LF to the control input terminal of the pulse generator VCO. The pulse generator VCO can be a voltage controlled oscillator and can be assumed to have the pulse train frequency $f_{VCO}=f_c$ with a disappearing control voltage $U_s$. Also, $df_{VCO}/dU_s > 0$ will be assumed. Then, with a phase difference of $0 < \epsilon < L/(2f_c)$, the pulse generator VCO will be assumed to produce a pulse train frequency $f_{VCO} > f_c$ until the condition of $\epsilon=0$ is reached. With the phase difference of $L/(2f_c) < \epsilon < L/f_c$, $f_{VCO} < f_c$ will continue until $\epsilon=0$ is again reached. Then the resulting loop composed of the pulse generator VCO, the pseudo-random generator PZG, the phase detector AS and the loop filter LF will maintain the phase difference at zero. In the event of a loss of synchronization, for example, due to an interruption in the incoming signal, the circuit will automatically accomplish and carry out a new acquisition process. When the phase difference has been regulated to synchronism and $\epsilon=0$, the phase jumps in the received signal $s_1(t)$ can be cancelled in a phase shifting device PU which receives the input signal $s_1(t)$ and also receives the output of the pseudo-random generator PZG produced locally in the receiver. The remaining processing of the signal in the receiver is carried out in the normal manner as known in the prior art and will not be discussed in detail herein. This signal which is to be processed comprises the output of the phase shift device PU.

The receiver synchronization means described has the advantage that the acquisition as well as the maintainance of synchronization and the reinitiation of the acquisition process following a loss of synchronization are accomplished by a single relatively simple circuit. The resistance to interference can be additionally increased due to the fact that when acquisition has been accomplished input 1 of the phase detector AS is activated only during those time periods at which the peaks of the signal $s_3(t)$ can be expected to exist.

FIG. 5 illustrates a modification of the circuit for further reducing the acquisition time in a synchronizing device according to the invention. It is to be observed that the element Kor, the phase detector AS, the loop filter LF, the voltage controlled oscillator VCO, the pseudo-random generator PZG and the phase inverter or phase reversing device PU in FIG. 5 have these identical relationship as illustrated in FIG. 2. In addition, a first threshold value detector D1 also receives the signal $s_3(t)$. The threshold of detector D1 is set to be such that depending on the known signal to noise ratio allows the autocorrelation pulses to be detected with a specific degree of probability and a specific error rate to exist. The pseudo-random generator PZG is set with the output of the threshold value circuit D1 which supplies an output to the setting circuit SS which supplies an input to the first input of an AND-gate UD which supplies an input to the pseudo-random generator PZG. This setting is accomplished by taking into account the signal delays in the detector D1 as well as in the setting circuit SS and in the AND-gate circuit UD and in the pseudo-random generator PZG. This ensures that the produced pseudo-random sequence has the phase difference of zero ($\epsilon=0$) relative to the received pseudo-random sequences as rapidly as possible. Under the most favorable conditions, the synchronism can be established during the first received pseudo-random sequence.

The pseudo-random generator PZG may be formed by a feedback shift register formed, for example, of settable bistable trigger stages. The signal $s_8(t)$ of the output of the setting circuit SS which following its actuation produces the established logic switching state H which is conveyed to the set inputs of the bistable trigger stages of the pseudo-random generator PZG.

So as to prevent the signal $s_8(t)$, triggering further setting processes that could occur due to false alarm and auto-correlation pulses following a successful synchronization, an additional second threshold value detector D2 monitors the voltage of a signal $s_6(t)$ at the output of a filter which receives the output of the phasing device PU. A signal $s_7(t)$ at the output of the detector D2 is supplied as a second input to the AND-gate UD and prevents a switch through of undesired setting pulses when the signal $s_6(t)$ has exceeded the threshold set in the threshold circuit D2.

Although the invention has been described with respect to preferred embodiments, it is not to be so limited as changes and modifications may be made therein which are within the full intended scope as defined by the appended claims.

We claim as our invention:

1. A circuit for interference suppressing communication transmission systems having narrow-band, conventional message modulation and additional pseudo-random phase shift keying (PN-PSK), and which serves to synchronize a pseudo-random generator which is located at the receiver and which actuates a phase shifting device at the receiver which cancels phase shift keying accomplished at the transmitter by using a regulating loop with a delay device such as a delay line for correlating the received signal with the pseudo-random sequence which is produced at the receiver, and in conformity with the transmitted pseudo-random sequence, consists of an apparently random line-up of the binary values L and H in a fixed pulse plan, where the sequence repeats after a specific number of timing pulses, characterized in that said delay device (VL) which is fed with the received signal ($s_1(t)$) possesses k output tappings with the time spacing ($T_c$) between them which corresponds to the inverse value of the pulse train frequency of the pseudo-random sequence, and a first portion ($k_H$) of the tappings is connected directly to an adder (S) and a second portion ($k_L$) of the tappings is connected to a 180° phase shifting element (Ph) which has its output connected to said adder (S), and the program selection of the tappings for the two portions is such that the one portion corresponds to the L-values and the other portion to the H-values of the binary pseudo-random sequence or a portion thereof, and a rectifier receiving the output signal of the adder (S), a phase detector (AS) receiving the output ($s_3(t)$) of said rectifier (GR) which has the form of a pulse and said phase detector (AS) also receiving a signal (s4(t)) which is periodically derived from the pseudo-random generator (PZG) mounted at the receiver, during each pseudo-random sequence produced by said generator (PZG) and which is in a suitable pulse form, said phase detector (AS) producing an output voltage (s5(t)) which is a regulating voltage dependent upon the mutual phase state of the two input signals and which is used to regulate the pulse train frequency of the pseudo-random generator (PZG) mounted at the receiver.

2. A circuit as claimed in claim 1, characterized in that the pulse signal (s4(t)) supplied to the second input of said phase detector (AS) is derived from the pseudo-random generator (PZG) in such manner that the pulse peaks of this signal train occur whenever the shift register stages of the pseudo-random generator (PZG) contain a configuration of the pseudo-random sequence produced at the receiver which differs from the configuration programmed into the tapped delay line (VL) by half the length of one period of the pseudo-random sequence.

3. A circuit as claimed in claim 1, characterized in that the phase detector (AS) is designed such that after the occurrence of a signal peak at one of its inputs, it produces a DC output voltage signal of a specific value, and following the occurrence of a signal peak at its second input, a DC output voltage signal of the same value but of opposite polarity occurs at its output.

4. A circuit as claimed in claim 3, characterized in that a bistable trigger stage comprises said phase detector (AS).

5. A circuit as claimed in claim 3 characterized in that the phase-detector input (1 in FIG. 2) receiving said rectified output signal (s3(t)) of said adder (s), i.e. the correlated signal, is supplied with a threshold circuit admitting only signals exceeding a definite threshold.

6. A circuit as claimed in claim 3 characterized in that the pulse train frequency of the pseudo-random generator (PZG) mounted at the receiver is controlled by a voltage controlled pulse generator (VCO), and the output voltage (s5(t)) produced by said phase detector (AS) is supplied as an input to the control input of said pulse generator (VCO) after having passed through a regulating loop filter (LF) to form a frequency regulating voltage (U_s).

7. A circuit as claimed in claim 3 characterized in that the output of said rectifier (G1) comprising the rectified output signal (s3(t)) of said adder (S), i.e. the correlated signal, is fed to a threshold value detector (D1) which has a threshold set based on the known signal to noise ratio, and is set such that the auto-correlation pulses are detected with a specific known probability and a specific known error rate, and a setting circuit (SS) receiving the output of said threshold value detector (D1), an AND-gate circuit (UD) receiving the output of said setting circuit (SS) and having an output signal (s8(t)) which is supplied to said pseudo-random generator (PZG) mounted at the receiver as a setting signal after compensating for signal delays which occur.

8. A circuit according to claim 7 characterized in that an AND-gate is between said setting circuit and said pseudo-random generator (PZG), and a second input signal (s7(t)) supplied to said AND-gate circuit (UD) which is obtained from the output of said phasing device (PU) and a filter (F) receiving the output of said phasing device, and a second threshold value detector circuit (D2) receiving the output of said filter and supplying an input to said AND-gate (UD) and the set threshold value of said second detector circuit (D2) based upon a specific known detection probability and upon a specific known error rate.

* * * * *